(12) United States Patent
Lin

(10) Patent No.: US 11,606,020 B2
(45) Date of Patent: Mar. 14, 2023

(54) POWER CONVERTING SYSTEM AND DC-TO-DC CONVERTING DEVICE

(71) Applicant: Top Victory Investments Limited, Kowloon (HK)

(72) Inventor: Li-Wei Lin, New Taipei (TW)

(73) Assignee: Top Victory Investments Limited, Kowloon (HK)

( * ) Notice: Subject to any disclaimer, the term of this patent is extended or adjusted under 35 U.S.C. 154(b) by 90 days.

(21) Appl. No.: 17/402,058

(22) Filed: Aug. 13, 2021

(65) Prior Publication Data

US 2022/0181972 A1      Jun. 9, 2022

(30) Foreign Application Priority Data

Dec. 8, 2020   (TW) ................................. 109143185

(51) Int. Cl.
*H02M 3/158*      (2006.01)
*H02M 1/00*       (2006.01)
*H05B 45/3725*    (2020.01)

(52) U.S. Cl.
CPC ......... *H02M 1/008* (2021.05); *H02M 1/0009* (2021.05); *H05B 45/3725* (2020.01)

(58) Field of Classification Search
CPC .. H02M 1/0067; H02M 1/008; H05B 45/3725
See application file for complete search history.

(56) References Cited

U.S. PATENT DOCUMENTS

| | | | |
|---|---|---|---|
| 11,329,556 B1 * | 5/2022 | Yang | H02M 3/1584 |
| 2010/0181831 A1 | 7/2010 | Miyazaki | |
| 2013/0147399 A1 | 6/2013 | Oshima et al. | |
| 2020/0042060 A1 | 2/2020 | Ohara et al. | |
| 2020/0153344 A1 * | 5/2020 | Park | H02M 3/1584 |
| 2021/0028686 A1 * | 1/2021 | Jiang | H02M 1/32 |
| 2021/0028704 A1 * | 1/2021 | Jiang | H02M 3/1584 |
| 2022/0038008 A1 * | 2/2022 | Wu | H02M 3/1586 |

FOREIGN PATENT DOCUMENTS

| | | |
|---|---|---|
| JP | 3267232 B2 | 3/2002 |
| JP | 2012050216 A | 3/2012 |

OTHER PUBLICATIONS

Extended European Search Report issued in corresponding EP Application No. 21190274.7 dated Jan. 28, 2022 (8 pages).

* cited by examiner

*Primary Examiner* — Alex Torres-Rivera

(74) *Attorney, Agent, or Firm* — Osha Bergman Watanabe & Burton LLP

(57) ABSTRACT

A system includes a first device and N number of second devices. The first device generates, based on a DC input signal, a first DC output voltage and a first enabling signal, enabled by which, a first one of the second devices generates a second DC output voltage and a second enabling signal based on the DC input signal. In a similar manner, an $i^{th}$ one of the second devices is enabled by an $(i-1)^{th}$ one of the second devices to generate an $(i+1)^{th}$ DC output voltage and an $(i+1)^{th}$ enabling signal based on the DC input signal. A starting time point of a logic-high level portion of each enabling signal is later than a peak time point corresponding to a peak voltage of the corresponding DC output voltage.

14 Claims, 5 Drawing Sheets

POWER CONVERTING SYSTEM AND DC-TO-DC CONVERTING DEVICE

CROSS-REFERENCE TO RELATED APPLICATION

This application claims priority of Taiwanese Invention Patent Application No. 109143185, filed on Dec. 8, 2020.

FIELD

The disclosure relates to a power converting system and a direct current to direct current (DC-to-DC) converting device.

BACKGROUND

A conventional light-emitting diode (LED) screen includes a plurality of LED display elements. Each of the LED display elements at least includes a power supply, a power converting system that includes a plurality of direct current to direct current (DC-to-DC) converting devices, and a plurality of LED components that respectively correspond to the DC-to-DC converting devices. The power supply is configured to generate a DC input signal. Each of the DC-to-DC converting devices is electrically connected to the power supply for receiving the DC input signal, and is configured to generate a DC output signal based on the DC input signal, and to output the DC output signal to the corresponding one of the LED components so as to drive the same to emit light.

However, the DC-to-DC converting devices of the power converting system may be simultaneously activated by the DC input signal to simultaneously generate the DC output signals. Since peaks of electric currents respectively in the DC output signals may occur at the same time and are superposed to form an excessively high electric current, the power supply may have to bear the excessively high electric current and may shut down for overcurrent protection.

SUMMARY

Therefore, an object of the disclosure is to provide a power converting system and a direct current to direct current (DC-to-DC) converting device that can alleviate at least one of the drawbacks of the prior art.

According to one aspect of the disclosure, a power converting system includes a first DC-to-DC converting device and N number of second DC-to-DC converting devices.

The first DC-to-DC converting device is configured to receive a DC input signal, and to generate a first DC output voltage and a first enabling signal based on the DC input signal. A starting time point of a logic-high level portion of the first enabling signal, where the first enabling signal is at a logic-high level, is later than a peak time point corresponding to a peak voltage of the first DC output voltage.

Each of the N number of second DC-to-DC converting devices is configured to receive the DC input signal, where N is a positive integer.

A first one of the N number of second DC-to-DC converting devices is electrically connected to the first DC-to-DC converting device for receiving the first enabling signal, and is configured to be enabled by the first enabling signal to generate a second DC output voltage and a second enabling signal at least based on the DC input signal. A starting time point of a logic-high level portion of the second enabling signal, where the second enabling signal is at a logic-high level, is later than a peak time point corresponding to a peak voltage of the second DC output voltage.

An $i^{th}$ one of the N number of second DC-to-DC converting devices, where i is a positive integer ranging from two to N, is electrically connected to an $(i-1)^{th}$ one of the N number of second DC-to-DC converting devices for receiving an $i^{th}$ enabling signal generated by the $(i-1)^{th}$ one of the N number of second DC-to-DC converting devices, and is configured to be enabled by the $i^{th}$ enabling signal to generate an $(i+1)^{th}$ DC output voltage and an (i+1) enabling signal at least based on the DC input signal. A starting time point of a logic-high level portion of the $(i+1)^{th}$ enabling signal, where the (i+1) enabling signal is at a logic-high level, is later than a peak time point corresponding to a peak voltage of the (i+1) DC output voltage.

According to another aspect of the disclosure, a DC-to-DC converting device includes a power convertor, a voltage-dividing unit, a current-detecting unit, a switching unit, a peak-values-comparing unit and a latching unit.

The power convertor is configured to receive a DC input signal, to generate a control signal at least based on the DC input signal, to generate a pulse-width modulation (PWM) signal at least based on the control signal and a feedback voltage, and to generate a DC output voltage based on the DC input signal and the PWM signal.

The voltage-dividing unit is electrically connected to the power convertor for receiving the DC output voltage, and is configured to divide the DC output voltage so as to generate the feedback voltage, and to output the feedback voltage to the power convertor.

The current-detecting unit is configured to detect the DC input signal so as to generate a detection current.

The switching unit has a first output end and a second output end, is electrically connected to the current-detecting unit and the power convertor for receiving the detection current and the PWM signal respectively therefrom, and is configured to be controlled, based on the PWM signal, to output the detection current via the first output end and the second output end, alternately.

The peak-values-comparing unit is electrically connected to the first output end and the second output end of the switching unit for receiving the detection current via the first output end and the second output end, alternately, is electrically connected to the power convertor for receiving the PWM signal, and is configured to generate a first peak-value-holding signal based on a part of the detection current received via the first output end of the switching unit, to generate a second peak-value-holding signal based on another part of the detection current received via the second output end of the switching unit, and to compare the first peak-value-holding signal and the second peak-value-holding signal based on the PWM signal so as to generate a comparison signal.

The latching unit is electrically connected to the power convertor and the peak-values-comparing unit for receiving the control signal and the comparison signal respectively therefrom, and is configured to generate an enabling signal based on the control signal and the comparison signal.

A starting time point of a logic-high level portion of the enabling signal, where the enabling signal is at a logic-high level, is later than a peak time point corresponding to a peak voltage of the DC output voltage.

The starting time point of the logic-high level portion of the enabling signal matches a time point at which the comparison signal changes from a logic-low level to a logic-high level.

An ending time point of the logic-high level portion of the enabling signal, where the enabling signal changes from the logic-high level to the logic-low level, matches a time point of transition of the control signal from a logic-high level to a logic-low level.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
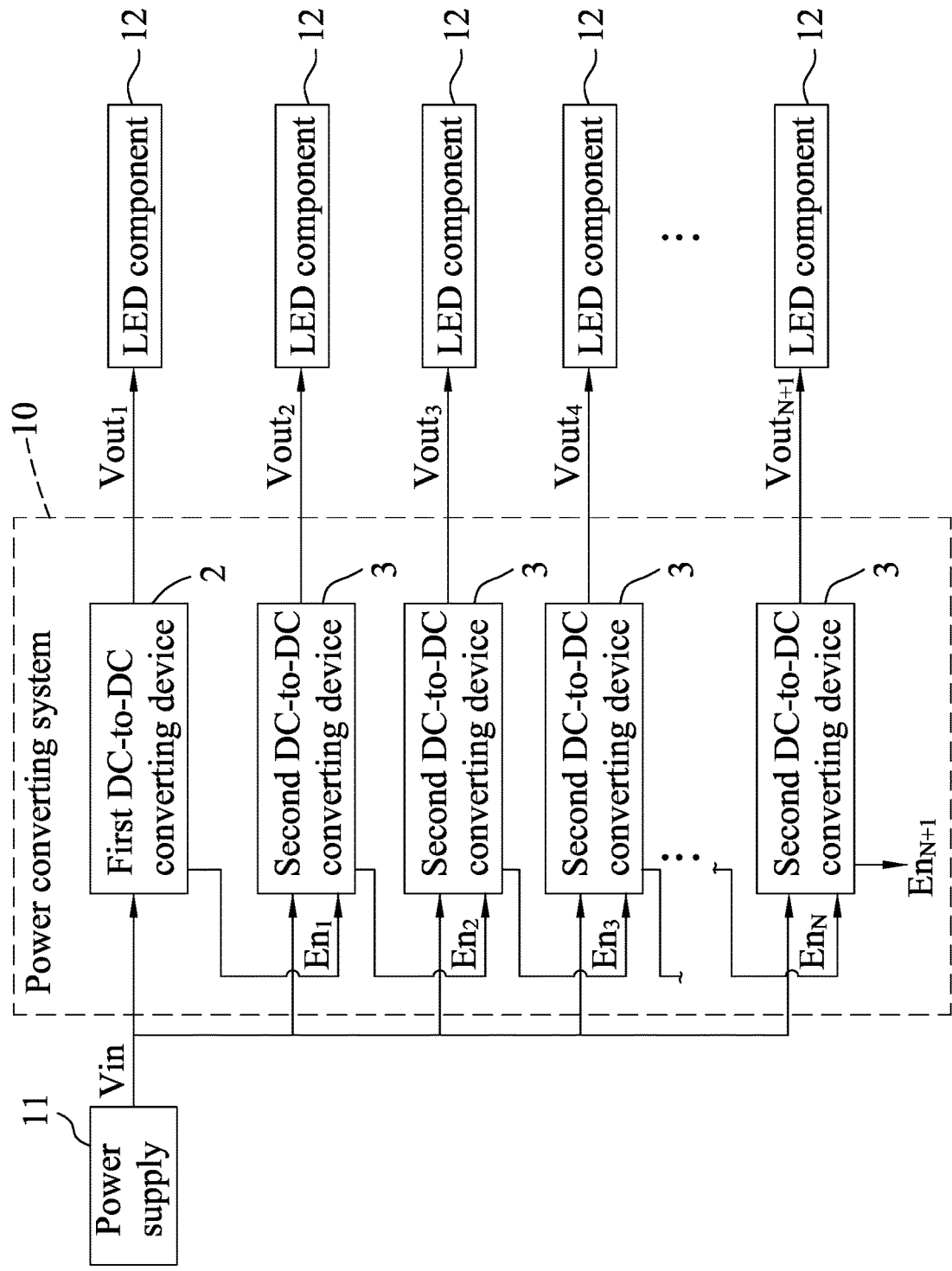
FIG. 1 is a block diagram illustrating an embodiment of a power converting system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a light-emitting diode (LED) display element which is used in an LED screen according to the disclosure is illustrated. The LED display element includes a power supply 11, a power converting system 10 and a plurality of LED components 12. The power supply 11 is configured to generate a direct current (DC) input signal (Vin). The power converting system 10 is electrically connected to the power supply 11 for receiving the DC input signal (Vin). The LED components 12 are electrically connected to the power converting system 10, and are to be driven by the power converting system 10 to emit light.

Figure 2:
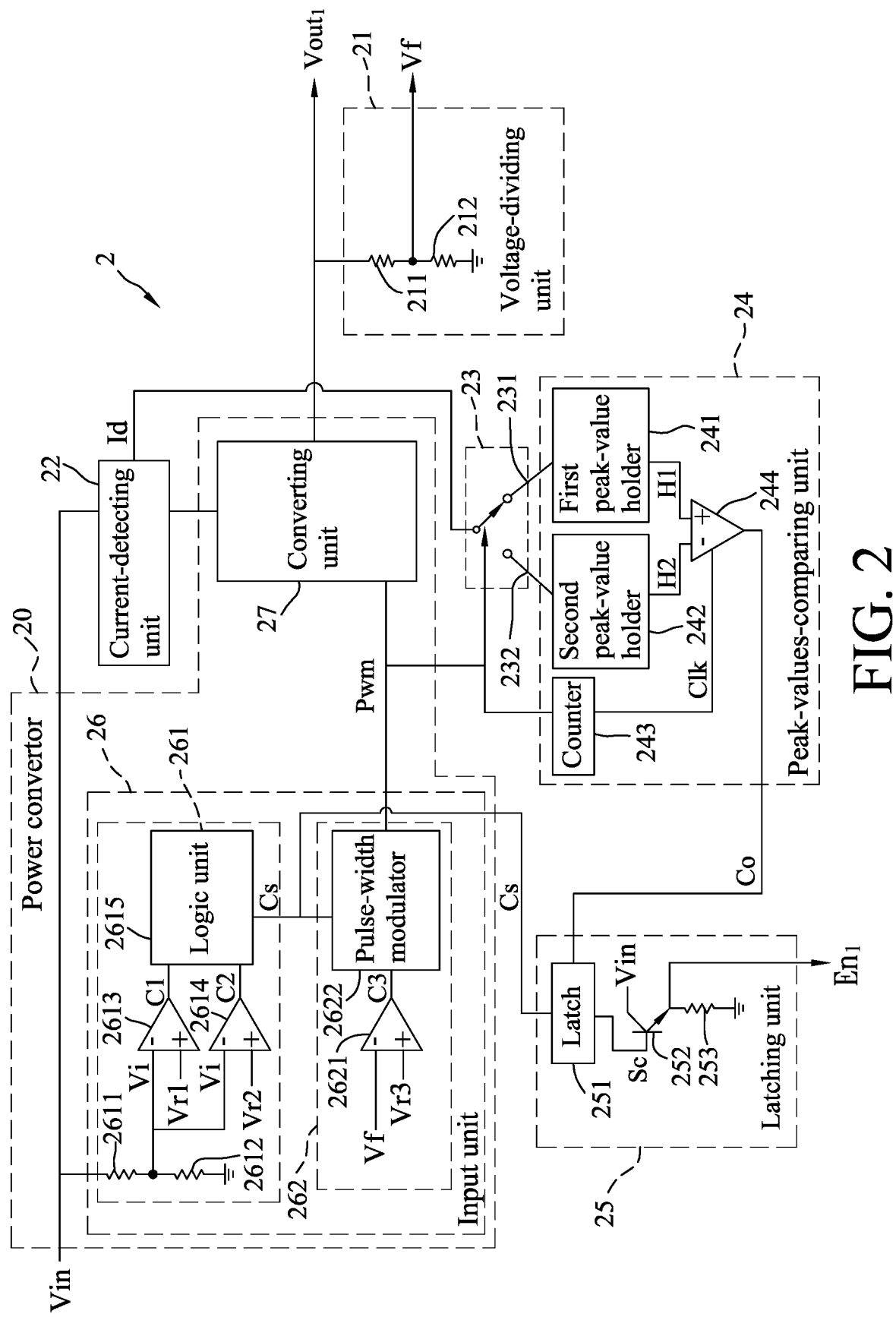
FIG. 2 is a circuit diagram illustrating an embodiment of a first direct current to direct current (DC-to-DC) converting device of the power converting system according to the disclosure.

Referring to FIGS. 1 and 2, an embodiment of the power converting system 10 according to the disclosure is illustrated. The power converting system 10 includes a first DC-to-DC converting device 2 configured to receive the DC input signal (Vin), and N number of second DC-to-DC converting devices 3 each configured to receive the DC input signal (Vin), where N is a positive integer. In this embodiment, each of the first DC-to-DC converting device 2 and the N number of second DC-to-DC converting devices 3 is implemented by a buck converter.

The first DC-to-DC converting device 2 is electrically connected to the power supply 11, and is configured to receive the DC input signal (Vin) from the power supply 11, and to generate a first DC output voltage (Vout$_1$) and a first enabling signal (En$_1$) based on the DC input signal (Vin).

A first one of the N number of second DC-to-DC converting devices 3 is electrically connected to the first DC-to-DC converting device 2 for receiving the first enabling signal (En$_1$), and is configured to be enabled by the first enabling signal (En$_1$) to generate a second DC output voltage (Vout$_2$) and a second enabling signal (En$_2$) at least based on the DC input signal (Vin).

An i$^{th}$ one of the N number of second DC-to-DC converting devices 3, where i is a positive integer ranging from two to N, is electrically connected to an (i−1)$^{th}$ one of the N number of second DC-to-DC converting devices 3 for receiving an i$^{th}$ enabling signal (En$_i$) generated by the (i−1)$^{th}$ one of the N number of second DC-to-DC converting devices 3, and is configured to be enabled by the i$^{th}$ enabling signal (En$_i$) to generate an (i+1)$^{th}$ DC output voltage (Vout$_{i+1}$) and an (i+1)$^{th}$ enabling signal (En$_{i+1}$) at least based on the DC input signal (Vin). It should be noted that the (N+1)$^{th}$ enabling signal (En$_N$+1) is not provided to any circuit element in this embodiment, but is not limited thereto in other embodiments.

Specifically speaking, referring to FIG. 2, the first DC-to-DC converting device 2 includes a power convertor 20, a voltage-dividing unit 21, a current-detecting unit 22, a switching unit 23, a peak-values-comparing unit 24 and a latching unit 25.

The power convertor 20 is configured to receive the DC input signal (Vin), to generate a control signal (Cs) at least based on the DC input signal (Vin), to generate a pulse-width modulation (PWM) signal (Pwm) at least based on the control signal (Cs) and a feedback voltage (Vf), and to generate the first DC output voltage (Vout$_1$) based on the DC input signal (Vin) and the PWM signal (Pwm). In this embodiment, the power convertor 20 includes an input unit 26 and a converting unit 27.

The input unit 26 is configured to receive the DC input signal (Vin), to generate the control signal (Cs) based on the DC input signal (Vin), a first preset reference voltage (Vr1) and a second preset reference voltage (Vr2), and to generate the PWM signal (Pwm) based on the control signal (Cs), a third preset reference voltage (Vr3) and the feedback voltage (Vf). The input unit 26 includes an input circuit 261 and a PWM circuit 262.

In this embodiment, the input circuit 261 includes a first input resister 2611, a second input resistor 2612, a first comparator 2613, a second comparator 2614 and a logic unit 2615.

The first input resistor 2611 has a dividing end, and a receiving end that is connected to the power supply 11 for receiving the DC input voltage (Vin). The second input resistor 2612 has another dividing end connected to the dividing end of the first input resistor 2611, and a grounded end that is grounded. A voltage across the second input resistor 2612 is outputted as a divided input voltage (Vi).

The first comparator 2613 has a non-inverting terminal for receiving the first preset reference voltage (Vr1), an inverting terminal for receiving the divided input voltage (Vi), and an output terminal for outputting a first comparison result (C1) which is made by comparing the first preset reference voltage (Vr1) with the divided input voltage (Vi).

The second comparator 2614 has a non-inverting terminal for receiving the second preset reference voltage (Vr2), an inverting terminal for receiving the divided input voltage (Vi), and an output terminal for outputting a second comparison result (C2) which is made by comparing the second preset reference voltage (Vr2) with the divided input voltage (Vi).

The logic unit 2615 is electrically connected to the first comparator 2613 and the second comparator 2614 for receiving the first comparison result (C1) and the second comparison result (C2) respectively therefrom. The logic unit 2615 is configured to generate the control signal (Cs)

based on the first comparison result (C1) and the second comparison result (C2). More specifically, the logic unit 2615 performs a NOR logical operation on the first comparison result (C1) and the second comparison result (C2). Since implementation of the logic unit 2615 has been well known to one skilled in the relevant art, detailed explanation of the same is omitted herein for the sake of brevity.

The PWM circuit 262 includes a third comparator 2621 and a pulse-width modulator 2622.

The third comparator 2621 has a non-inverting terminal for receiving the third preset reference voltage (Vr3), an inverting terminal for receiving the feedback voltage (Vf), and an output terminal for outputting a third comparison result (C3) which is made by comparing the third preset reference voltage (Vr3) with the feedback voltage (Vf).

The pulse-width modulator 2622 is electrically connected to the converting unit 27, the switching unit 23 and the peak-values-comparing unit 24. The pulse-width modulator 2622 is further electrically connected to the logic unit 2615 and the third comparator 2621 for receiving the control signal (Cs) and the third comparison result (C3) respectively therefrom. The pulse-width modulator 2622 is configured to generate the PWM signal (Pwm) based on the control signal (Cs) and the third comparison result (C3), and to output the PWM signal (Pwm) to the converting unit 27, the switching unit 23 and the peak-values-comparing unit 24. Since implementation of the pulse-width modulator 2622 has been well known to one skilled in the relevant art, detailed explanation of the same is omitted herein for the sake of brevity.

The converting unit 27 is electrically connected to the power supply 11 and the pulse-width modulator 2622 of the input unit 26 for receiving the DC input signal (Vin) and the PWM signal (Pwm) respectively therefrom.

The converting unit 27 is configured to convert the DC input signal (Vin), based on the PWM signal (Pwm), into the first DC output voltage ($Vout_1$) so as to output the first DC output voltage ($Vout_1$).

Figure 3:
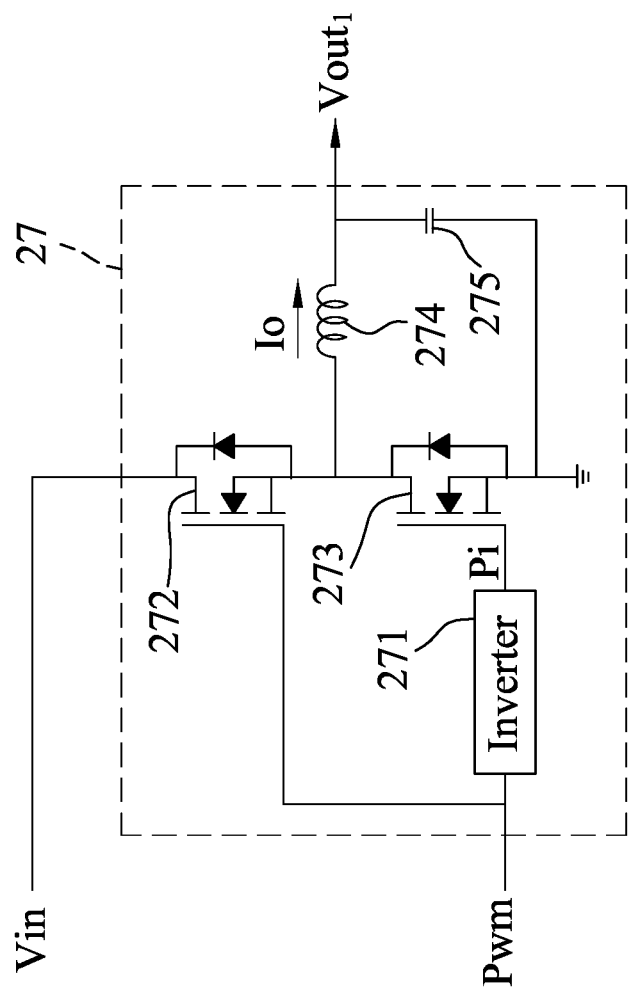
FIG. 3 is a circuit diagram illustrating an embodiment of a converting unit of the first DC-to-DC converting device according to the disclosure.

Specifically, as shown in FIG. 3, the converting unit 27 includes an inverter 271, a first transistor 272, a second transistor 273, an inductor 274 and a capacitor 275.

The inverter 271 is electrically connected to the pulse-width modulator 2622 of the input unit 26 for receiving the PWM signal (Pwm), and is configured to generate an inverted signal (Pi) based on the PWM signal (Pwm). The first transistor 272 has a first terminal that is configured to receive the DC input signal (Vin), a second terminal, and a control terminal that is electrically connected to the pulse-width modulator 2622 for receiving the PWM signal (Pwm). The second transistor 273 has a first terminal that is electrically connected to the second terminal of the first transistor 272, a second terminal that is grounded, and a control terminal that is electrically connected to the inverter 271 for receiving the inverted signal (Pi). In this embodiment, each of the first transistor 272 and the second transistor 273 is implemented by an N-type metal-oxide-semiconductor field-effect transistor.

The capacitor 275 is connected in series with the inductor 274, and the series connection of the capacitor 275 and the inductor 274 is connected in parallel to the second transistor 273. A voltage across the capacitor 275 serves as the first DC output voltage ($Vout_1$).

The voltage-dividing unit 21 is electrically connected to the converting unit 27 for receiving the first DC output voltage ($Vout_1$). The voltage-dividing unit 21 is configured to divide the first DC output voltage ($Vout_1$) so as to generate the feedback voltage (Vf), and to output the feedback voltage (Vf) to the inverting terminal of the third comparator 2621 of the input unit 26.

Specifically, the voltage-dividing unit 21 includes a first output resistor 211 and a second output resistor 212. The first output resistor 211 has a dividing end, and a receiving end that is connected to the converting unit 27 for receiving the first DC output voltage ($Vout_1$). The second output resistor 212 has another dividing end that is connected to the dividing end of the first output resistor 211, and a grounded end that is grounded. A voltage across the second output resistor 212 is outputted as the feedback voltage (Vf).

The current-detecting unit 22 is configured to detect the DC input signal (Vin) so as to generate a detection current (Id).

The switching unit 23 has a first output end 231 and a second output end 232, and is electrically connected to the current-detecting unit 22 and the input unit 26 for receiving the detection current (Id) and the PWM signal (Pwm) respectively therefrom. The switching unit 23 is configured to be controlled, based on the PWM signal (Pwm), to output the detection current (Id) via the first output end 231 and the second output end 232, alternately.

The peak-values-comparing unit 24 is electrically connected to the first output end 231 and the second output end 232 of the switching unit 23 for receiving the detection current (Id) via the first output end 231 and the second output end 232, alternately. The peak-values-comparing unit 24 is electrically connected to the input unit 26 for receiving the PWM signal (Pwm). The peak-values-comparing unit 24 is configured to generate a first peak-value-holding signal (H1) based on a part of the detection current (Id) received via the first output end 231 of the switching unit 23, to generate a second peak-value-holding signal (H2) based on another part of the detection current (Id) received via the second output end 232 of the switching unit 23, and to compare the first peak-value-holding signal (H1) and the second peak-value-holding signal (H2) based on the PWM signal (Pwm) so as to generate a comparison signal (Co).

Specifically, the peak-values-comparing unit 24 includes a first peak-value holder 241, a second peak-value holder 242, a counter 243 and a comparator 244.

The first peak-value holder 241 is electrically connected to the first output end 231 of the switching unit 23 for receiving the part of the detection current (Id), and is configured to generate the first peak-value-holding signal (H1) based on the part of the detection current (Id).

The second peak-value holder 242 is electrically connected to the second output end 232 of the switching unit 23 for receiving the another part of the detection current (Id), and is configured to generate the second peak-value-holding signal (H2) based on the another part of the detection current (Id).

It is worth to note that peak values of pulses of the detection current (Id) are alternately recorded in the first peak-value-holding signal (H1) and the second peak-value-holding signal (H2) thus generated. For each of the pulses of the detection current (Id), a signal level of one of the first peak-value-holding signal (H1) and the second peak-value-holding signal (H2) is held (i.e., a horizontal part of the waveform shown in FIG. 4) while the pulse of the detection current (Id) is extracted by the switching unit 23 to form the other one of the first peak-value-holding signal (H1) and the second peak-value-holding signal (H2).

The counter 243 is electrically connected to the input unit 26 for receiving the PWM signal (Pwm), and is configured to generate a clock signal (Clk) based on the PWM signal (Pwm).

The comparator 244 has a first input terminal, a second input terminal, a third input terminal and an output terminal. The first input terminal is electrically connected to the first peak-value holder 241 for receiving the first peak-value-holding signal (H1). The second input terminal is electrically connected to the second peak-value holder 242 for receiving the second peak-value-holding signal (H2). The third input terminal is electrically connected to the counter 243 for receiving the clock signal (Clk). The comparator 244 is configured to compare, according to enablement of the clock signal (Clk), the first peak-value-holding signal (H1) and the second peak-value-holding signal (H2) so as to generate the comparison signal (Co), and to output the comparison signal (Co) via the output terminal thereof.

Figure 4:
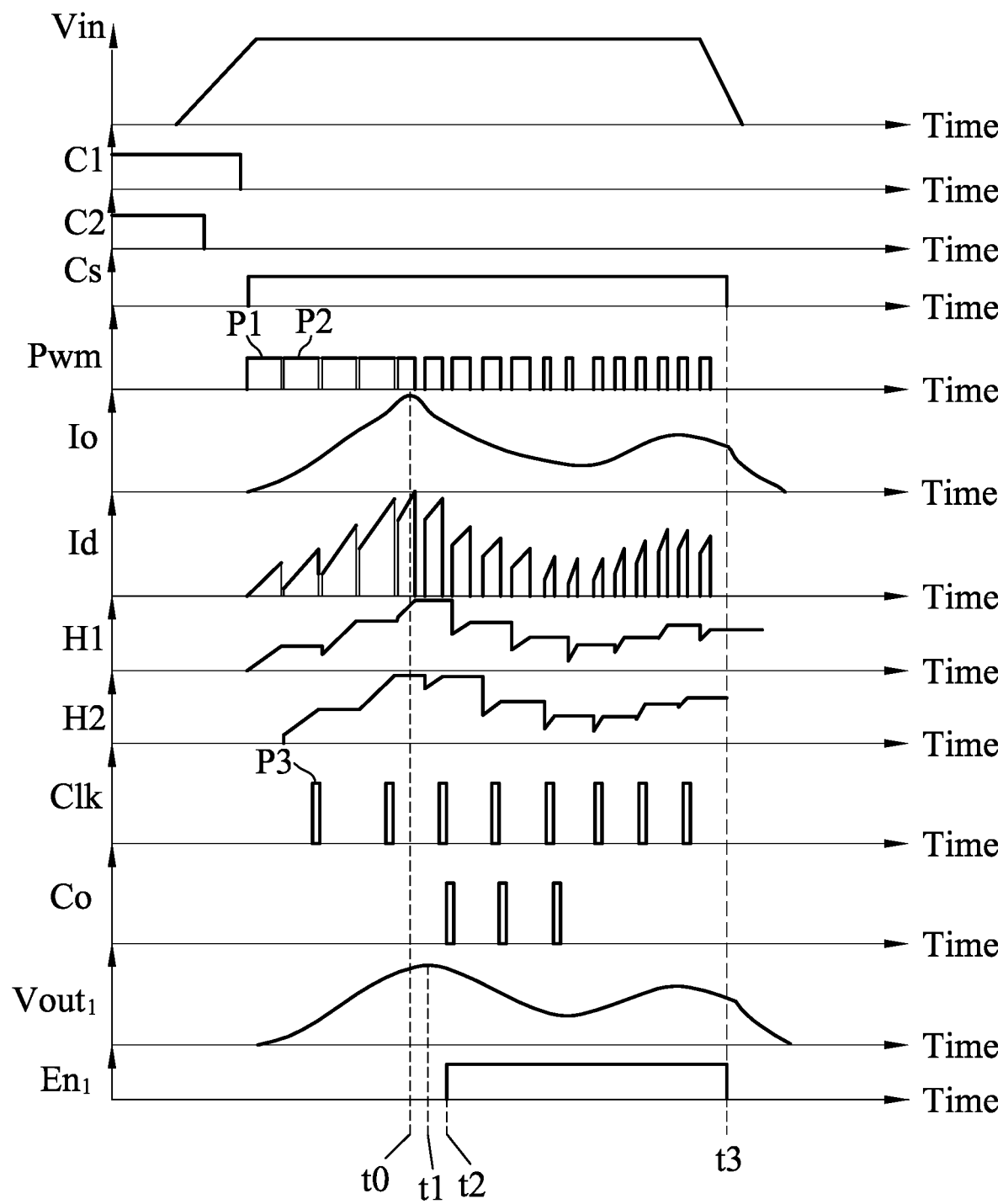
FIG. 4 is a timing diagram illustrating an embodiment of operation of the first DC-to-DC converting device according to the disclosure.

The latching unit 25 is electrically connected to the logic unit 2615 of the input circuit 261 of the input unit 26 and the comparator 244 of the peak-values-comparing unit 24 for receiving the control signal (Cs) and the comparison signal (Co) respectively therefrom. The latching unit 25 is configured to generate the first enabling signal ($En_1$) based on the control signal (Cs) and the comparison signal (Co). Referring to FIG. 4, a starting time point (t2) of a logic-high level portion of the first enabling signal ($En_1$), where the first enabling signal ($En_1$) is at a logic-high level, matches a time point at which the comparison signal (Co) changes from a logic-low level to the logic-high level. An ending time point (t3) of the logic-high level portion of the first enabling signal ($En_1$), where the first enabling signal ($En_1$) changes from the logic-high level to the logic-low level, matches a time point of transition of the control signal (Cs) from a logic-high level to a logic-low level.

Specifically, the latching unit 25 includes a latch 251, a transistor 252 and a resistor 253.

The latch 251 is electrically connected to the logic unit 2615 and the comparator 244 for receiving the control signal (Cs) and the comparison signal (Co) respectively therefrom. The latch 251 is configured to generate a switching-control signal (Sc) based on the control signal (Cs) and the comparison signal (Co), to latch, when the comparison signal (Co) changes from a logic-low level to a logic-high level and when the switching-control signal (Sc) is at a logic-low level, the switching-control signal (Sc) to the logic-high level, and to change, when the control signal (Cs) changes from the logic-high level to the logic-low level, the switching-control signal (Sc) from a logic-high level to the logic-low level.

The transistor 252 has a first terminal that is configured to receive the DC input signal (Vin), a second terminal that is configured to output the first enabling signal ($En_1$) and that is electrically connected to one end of the resistor 253 which has the other end grounded, and a control terminal that is electrically connected to the latch 251 for receiving the switching-control signal (Sc). The transistor 252 is configured to switch, based on the switching-control signal (Sc), between a conducting state and a non-conducting state. In this embodiment, the transistor 252 is implemented by an NPN-type bipolar junction transistor.

Referring to a timing diagram shown in FIG. 4, operation of the power converting system according to the disclosure will now be explained. In response to receipt of two consecutive rectangular pulses (e.g., rectangular pulses "P1" and "P2") of the PWM signal (Pwm), the counter 243 generates a rectangular pulse (e.g., a rectangular pulse "P3") in the clock signal (Clk), and outputs the rectangular pulse to the comparator 244 so as to enable the comparator 244 to generate the comparison signal (Co) by comparing the first peak-value-holding signal (H1) and the second peak-value-holding signal (H2). When a signal level of the first peak-value-holding signal (H1) is higher than a signal level of the second peak-value-holding signal (H2) both of which correspond in time with a rectangular pulse in the clock signal (Clk), the comparison signal (Co) changes from the logic-low level to the logic-high level. As a result, the latching unit 25 changes the first enabling signal ($En_1$) from the logic-low level to the logic-high level, and holds the first enabling signal ($En_1$) at the logic-high level. Later on, when the signal level of the first peak-value-holding signal (H1) changes to be lower than that of the second peak-value-holding signal (H2), even if the comparison signal (Co) changes from the logic-high level to the logic-low level, the first enabling signal ($En_1$) is still held at the logic-high level until the control signal (Cs) changes from the logic-high level to the logic-low level occurs. When the control signal (Cs) changes from the logic-high level to the logic-low level, the first enabling signal ($En_1$) changes from the logic-high level to the logic-low level.

It should be noted that the starting time point (t2) of the logic-high level portion of the first enabling signal ($En_1$) is later than a peak time point (t1) corresponding to a peak voltage of the first DC output voltage ($Vout_1$), and is also later than another peak time point (t0) corresponding to a peak electric current of a DC output current (Io) passing through the inductor 274 (see FIG. 3). Therefore, transition of the first enabling signal ($En_1$) from the logic-low level to the logic-high level can be regarded as a post-peak indicator which indicates that the peak electric current and the peak voltage have occurred.

Figure 5:
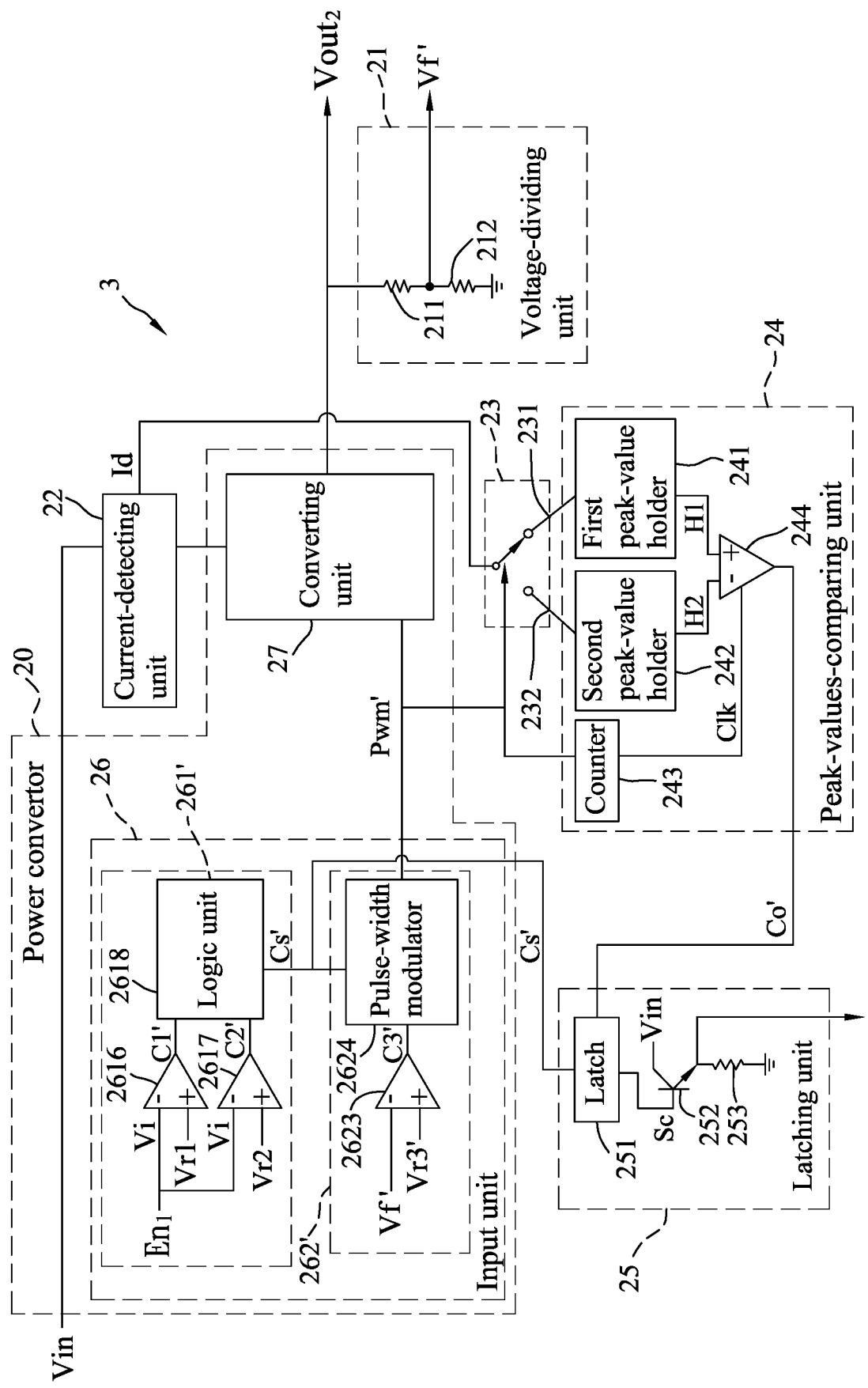
FIG. 5 is a circuit diagram illustrating an embodiment of a second DC-to-DC converting device of the power converting system according to the disclosure.

Referring to FIG. 5, each of the N number of second DC-to-DC converting devices 3 includes a voltage-dividing unit 21, a current-detecting unit 22, a switching unit 23, a peak-values-comparing unit 24, a latching unit 25, an input unit 26 and a converting unit 27. It should be noted that each of the N number of second DC-to-DC converting devices 3 is similar to the first DC-to-DC converting device 2 as shown in FIG. 2, so descriptions regarding components identical to those of the first DC-to-DC converting device 2, namely the current-detecting unit 22 and the switching unit 23, are not repeated, and only differences between the first DC-to-DC converting device 2 and the N number of second DC-to-DC converting devices 3 are explained in the following paragraphs for the sake of brevity. It should also be noted herein that FIG. 5 depicts the first one of the N number of second DC-to-DC converting devices 3, as an example.

The input unit 26 is configured to receive a corresponding one of the enabling signals (one of the first, the second to the $N^{th}$ enabling signals ($En_1$, $En_2$, . . . $En_N$) (see FIG. 1)), to generate another control signal (Cs') based on the first preset reference voltage (Vr1), the second preset reference voltage (Vr2) and the corresponding one of the enabling signals, and to generate another PWM signal (Pwm') based on the another control signal (Cs'), the third preset reference voltage (Vr3) and another feedback voltage (Vf).

The input unit 26 includes an input circuit 261' and a PWM circuit 262'.

The input circuit 261' includes a first comparator 2616, a second comparator 2617 and a logic unit 2618.

The first comparator 2616 has a non-inverting terminal for receiving the first preset reference voltage (Vr1), an inverting terminal for receiving the corresponding one of the enabling signals, and an output terminal for outputting a first comparison result (C1') which is made by comparing the first preset reference voltage (Vr1) with the corresponding one of the enabling signals.

The second comparator 2617 has a non-inverting terminal for receiving the second preset reference voltage (Vr2), an inverting terminal for receiving the corresponding one of the enabling signals, and an output terminal for outputting a second comparison result (C2' which is made by comparing the second preset reference voltage (Vr2) with the corresponding one of the enabling signals.

The logic unit 2618 is electrically connected to the first comparator 2616 and the second comparator 2617 for receiving the first comparison result (C1') and the second comparison result (C2') respectively therefrom, and is configured to generate the another control signal (Cs') based on the first comparison result (C1') and the second comparison result (C2').

The PWM circuit 262' includes a third comparator 2623 and a pulse-width modulator 2624.

The third comparator 2623 has a non-inverting terminal for receiving the third preset reference voltage (Vr3), an inverting terminal for receiving the another feedback voltage (Vf'), and an output terminal for outputting a third comparison result (C3') which is made by comparing the third preset reference voltage (Vr3) with the another feedback voltage (Vf').

The pulse-width modulator 2624 is electrically connected to the converting unit 27, the switching unit 23 and the peak-values-comparing unit 24. The pulse-width modulator 2624 is electrically connected to the logic unit 2618 and the third comparator 2623 for receiving the another control signal (Cs') and the third comparison result (C3') respectively therefrom, and is configured to generate the another PWM signal (Pwm') based on the another control signal (Cs') and the third comparison result (C3'), and to output the another PWM signal (Pwm') to the converting unit 27, the switching unit 23 and the peak-values-comparing unit 24.

The converting unit 27 is electrically connected to the input unit 26 for receiving the another PWM signal (Pwm'). The converting unit 27 is further configured to receive the DC input signal (Vin), to convert the DC input signal (Vin), based on the another PWM signal (Pwm'), into a corresponding one of DC output voltages (one of the second, third to $(N+1)^{th}$ DC output voltages (Vout$_2$, Vout$_3$, ..., Vout$_{N+1}$) (see FIG. 1)) so as to output the same.

The voltage-dividing unit 21 is electrically connected to the converting unit 27 for receiving the corresponding one of the DC output voltages. The voltage-dividing unit 21 is configured to divide the corresponding one of the DC output voltages so as to generate the another feedback voltage (Vf'), and to output the another feedback voltage (Vf') to the input unit 26.

The peak-values-comparing unit 24 is electrically connected to the first output end 231 and the second output end 232 of the switching unit 23 for receiving the detection current (Id) via the first output end 231 and the second output end 232, alternately. The peak-values-comparing unit 24 is electrically connected to the input unit 26 for receiving the another PWM signal (Pwm'), and is configured to generate a first peak-value-holding signal (H1) based on a part of the detection current (Id) received via the first output end 231 of the switching unit 23, to generate a second peak-value-holding signal (H2) based on another part of the detection current (Id) received via the second output end 232 of the switching unit 23, and to compare the first peak-value-holding signal (H1) and the second peak-value-holding signal (H2) based on the another PWM signal (Pwm') so as to generate another comparison signal (Co').

The latching unit 25 is electrically connected to the input unit 26 and the peak-values-comparing unit 24 for receiving the another control signal (Cs') and the another comparison signal (Co') respectively therefrom. The latching unit 25 is configured to generate a corresponding one of the enabling signals (one of the second, third to (N+1) enabling signals (En$_2$, En$_3$, ..., En$_{N+1}$) (see FIG. 1)) based on the another control signal (Cs') and the another comparison signal (Co').

Similarly, a starting time point of a logic-high level portion of the second enabling signal (En$_2$), where the second enabling signal (En$_2$) is at a logic-high level, is later than a peak time point corresponding to a peak voltage of the second DC output voltage (Vout$_2$) and a starting time point of a logic-high level portion of the $(i+1)^{th}$ enabling signal (En$_{i+1}$), where the $(i+1)^{th}$ enabling signal (En$_{i+1}$) is at a logic-high level, is later than a peak time point corresponding to a peak voltage of the $(i+1)^{th}$ DC output voltage (Vout$_{i+1}$).

It should be noted that the starting time point of the logic-high level portion of the corresponding one of the enabling signals for the second DC-to-DC converting devices 3 matches a time point at which the another comparison signal (Co') changes from a logic-low level to a logic-high level, and that an ending time point of the logic-high level portion of the corresponding one of the enabling signals, where the corresponding one of the enabling signals changes from the logic-high level to the logic-low level, matches a time point of transition of the another control signal (Cs') from a logic-high level to a logic-low level.

To sum up, the power converting system 10 according to the disclosure includes the first DC-to-DC converting device 2 and the N number of second DC-to-DC converting devices 3, where N is a positive integer. The first one of the N number of second DC-to-DC converting devices 3 is electrically connected to the first DC-to-DC converting device 2 and to be enabled by the first enabling signal (En$_1$) generated by the first DC-to-DC converting device 2, and the $i^{th}$ one of the N number of second DC-to-DC converting devices 3 is electrically connected to the $(i-1)^{th}$ one of the N number of second DC-to-DC converting devices 3 and to be enabled by the $i^{th}$ enabling signal (En$_i$) generated by the $(i-1)^{th}$ one of the N number of second DC-to-DC converting devices 3, where i is a positive integer ranging from two to N. Moreover, the starting time point (t2) of the logic-high level portion of the first enabling signal (En$_1$) is later than the peak time point (t1) corresponding to the peak voltage of the first DC output voltage (Vout$_1$) generated by the first DC-to-DC converting device 2, the starting time point of the logic-high level portion of the second enabling signal (En$_2$) is later than the peak time point corresponding to the peak voltage of the second DC output voltage (Vout$_2$) generated by the first one of the N number of second DC-to-DC converting devices 3, and the starting time point of the logic-high level portion of the $(i+1)^{th}$ enabling signal (En$_{i+1}$) is later than the peak time point corresponding to the peak voltage of the $(i+1)^{th}$ DC output voltage (Vout$_{i+1}$) generated by the $i^{th}$ one of the N number of second DC-to-DC converting devices 3. In this way, peaks of electric currents outputted by the first DC-to-DC converting device 2 and the N number of second DC-to-DC converting devices 3 will not occur at the same time, and formation of an excessively high electric current may thereby be avoided. Consequently, shutdown of the power supply 11 due to bearing such excessively high electric current may be prevented.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A power converting system, comprising:
a first direct current to direct current (DC-to-DC) converting device configured to receive a DC input signal, and to generate a first DC output voltage and a first enabling signal based on the DC input signal, a starting time point of a logic-high level portion of the first enabling signal, where the first enabling signal is at a logic-high level, being later than a peak time point that corresponds to a peak voltage of the first DC output voltage; and
N number of second DC-to-DC converting devices each configured to receive the DC input signal, where N is a positive integer,
wherein a first one of said N number of second DC-to-DC converting devices is electrically connected to said first DC-to-DC converting device for receiving the first enabling signal, and is configured to be enabled by the first enabling signal to generate a second DC output voltage and a second enabling signal at least based on the DC input signal, a starting time point of a logic-high level portion of the second enabling signal, where the second enabling signal is at a logic-high level, being later than a peak time point that corresponds to a peak voltage of the second DC output voltage,
wherein an $i^{th}$ one of said N number of second DC-to-DC converting devices, where i is a positive integer ranging from two to N, is electrically connected to an $(i-1)^{th}$ one of said N number of second DC-to-DC converting devices for receiving an $i^{th}$ enabling signal generated by said $(i-1)^{th}$ one of said N number of second DC-to-DC converting devices, and is configured to be enabled by the $i^{th}$ enabling signal to generate an $(i+1)^{th}$ DC output voltage and an $(i+1)$ enabling signal at least based on the DC input signal, a starting time point of a logic-high level portion of the $(i+1)^{th}$ enabling signal, where the $(i+1)^{th}$ enabling signal is at a logic-high level, being later than a peak time point that corresponds to a peak voltage of the $(i+1)^{th}$ DC output voltage.

2. The power converting system as claimed in claim 1, wherein said first DC-to-DC converting device includes:
an input unit that is configured to receive the DC input signal, to generate a control signal based on the DC input signal, a first preset reference voltage and a second preset reference voltage, and to generate a pulse-width modulation (PWM) signal based on the control signal, a third preset reference voltage and a feedback voltage;
a converting unit that is configured to receive the DC input signal, that is electrically connected to said input unit for receiving the PWM signal, and that is configured to convert the DC input signal, based on the PWM signal, into the first DC output voltage so as to output the first DC output voltage;
a voltage-dividing unit that is electrically connected to said converting unit for receiving the first DC output voltage, and that is configured to divide the first DC output voltage so as to generate the feedback voltage, and to output the feedback voltage to said input unit;
a current-detecting unit that is configured to detect the DC input signal so as to generate a detection current;
a switching unit that has a first output end and a second output end, that is electrically connected to said current-detecting unit and said input unit for receiving the detection current and the PWM signal respectively therefrom, and that is configured to be controlled, based on the PWM signal, to output the detection current via said first output end and said second output end, alternately;
a peak-values-comparing unit that is electrically connected to said first output end and said second output end of said switching unit for receiving the detection current via said first output end and said second output end, alternately, that is electrically connected to said input unit for receiving the PWM signal, and that is configured to generate a first peak-value-holding signal based on a part of the detection current received via said first output end of said switching unit, to generate a second peak-value-holding signal based on another part of the detection current received via said second output end of said switching unit, and to compare the first peak-value-holding signal and the second peak-value-holding signal based on the PWM signal so as to generate a comparison signal; and
a latching unit that is electrically connected to said input unit and said peak-values-comparing unit for receiving the control signal and the comparison signal respectively therefrom, and that is configured to generate the first enabling signal based on the control signal and the comparison signal,
wherein the starting time point of the logic-high level portion of the first enabling signal matches a time point at which the comparison signal changes from a logic-low level to a logic-high level, and an ending time point of the logic-high level portion of the first enabling signal, where the first enabling signal changes from the logic-high level to a logic-low level, matches a time point of transition of the control signal from a logic-high level to a logic-low level.

3. The power converting system as claimed in claim 2, wherein said peak-values-comparing unit includes:
a first peak-value holder that is electrically connected to said first output end of said switching unit for receiving the part of the detection current, and that is configured to generate the first peak-value-holding signal based on the part of the detection current;
a second peak-value holder that is electrically connected to said second output end of said switching unit for receiving the another part of the detection current, and that is configured to generate the second peak-value-holding signal based on the another part of the detection current;
a counter that is electrically connected to said input unit for receiving the PWM signal, and that is configured to generate a clock signal based on the PWM signal; and
a comparator that has
a first input terminal electrically connected to said first peak-value holder for receiving the first peak-value-holding signal,
a second input terminal electrically connected to said second peak-value holder for receiving the second peak-value-holding signal,
a third input terminal electrically connected to said counter for receiving the clock signal, and
an output terminal,
wherein said comparator is configured to compare, according to the clock signal, the first peak-value-holding signal and the second peak-value-holding signal so as to generate the comparison signal, and to output the comparison signal via said output terminal thereof.

4. The power converting system as claimed in claim 2, wherein said latching unit includes:
a latch that is electrically connected to said input unit and said peak-values-comparing unit for receiving the control signal and the comparison signal respectively therefrom, and that is configured to
generate a switching-control signal based on the control signal and the comparison signal,
latch, when the comparison signal changes from the logic-low level to the logic-high level and when the switching-control signal is at the logic-low level, the switching-control signal to a logic-high level, and
change, when the control signal changes from the logic-high level to the logic-low level, the switching-control signal from the logic-high level to a logic-low level;
a transistor that has a first terminal which is configured to receive the DC input signal, a second terminal which is configured to output the first enabling signal, and a control terminal which is electrically connected to said latch for receiving the switching-control signal, said transistor being configured to switch, based on the switching-control signal, between a conducting state and a non-conducting state; and
a resistor that has one end which is grounded, and the other end which is electrically connected to said second terminal of said transistor.

5. The power converting system as claimed in claim 2, wherein said voltage-dividing unit includes:
a first output resistor that has a receiving end connected to said converting unit for receiving the first DC output voltage, and a dividing end; and
a second output resistor that has another dividing end connected to said dividing end of said first output resistor, and a grounded end that is grounded, a voltage across said second output resistor being outputted as the feedback voltage.

6. The power converting system as claimed in claim 2, wherein said converting unit includes:
an inverter electrically connected to said input unit for receiving the PWM signal, and configured to generate an inverted signal based on the PWM signal;
a first transistor having
a first terminal that is configured to receive the DC input signal,
a second terminal, and
a control terminal that is electrically connected to said input unit for receiving the PWM signal;
a second transistor having
a first terminal that is electrically connected to said second terminal of said first transistor,
a second terminal that is grounded, and
a control terminal that is electrically connected to said inverter for receiving the inverted signal;
an inductor; and
a capacitor that is connected in series with said inductor, the series connection of said capacitor and said inductor being connected in parallel to said second transistor,
wherein a voltage across said capacitor serves as the first DC output voltage.

7. The power converting system as claimed in claim 1, wherein each of said N number of second DC-to-DC converting devices includes:
an input unit, for the first one of said N number of second DC-to-DC converting devices, said input unit being configured to receive the first enabling signal, to generate a control signal based on a first preset reference voltage, a second preset reference voltage and the first enabling signal, and to generate another PWM signal based on the control signal, a third preset reference voltage and a feedback voltage, and for the $i^{th}$ one of said N number of second DC-to-DC converting devices, said input unit being configured to receive the $i^{th}$ enabling signal, to generate a control signal based on a first preset reference voltage, a second preset reference voltage and the $i^{th}$ enabling signal, and to generate another PWM signal based on the control signal, a third preset reference voltage and a feedback voltage;
a converting unit that is configured to receive the DC input signal, that is electrically connected to said input unit for receiving the another PWM signal, for the first one of said N number of second DC-to-DC converting devices, said converting unit being configured to convert the DC input signal, based on the another PWM signal, into the second DC output voltage so as to output the same, and for the $i^{th}$ one of said N number of second DC-to-DC converting devices, said converting unit being configured to convert the DC input signal, based on the another PWM signal, into the $(i+1)^{th}$ DC output voltage so as to output the same;
a voltage-dividing unit, for the first one of said N number of second DC-to-DC converting devices, said voltage-dividing unit being electrically connected to said converting unit for receiving the second DC output voltage, and being configured to divide the second DC output voltage so as to generate the feedback voltage, and to output the feedback voltage to said input unit, and for the $i^{th}$ one of said N number of second DC-to-DC converting devices, said voltage-dividing unit being electrically connected to said converting unit for receiving the $(i+1)^{th}$ DC output voltage, and being configured to divide the $(i+1)^{th}$ DC output voltage so as to generate the feedback voltage, and to output the feedback voltage to said input unit;
a current-detecting unit that is configured to detect the DC input signal so as to generate a detection current;
a switching unit that has a first output end and a second output end, that is electrically connected to said current-detecting unit and said input unit for receiving the detection current and the another PWM signal respectively therefrom, and that is configured to be controlled, based on the another PWM signal, to output the detection current via said first output end and said second output end, alternately;

a peak-values-comparing unit that is electrically connected to said first output end and said second output end of said switching unit for receiving the detection current via said first output end and said second output end, alternately, that is electrically connected to said input unit for receiving the another PWM signal, and that is configured to generate a first peak-value-holding signal based on a part of the detection current received via said first output end of said switching unit, to generate a second peak-value-holding signal based on another part of the detection current received via said second output end of said switching unit, and to compare the first peak-value-holding signal and the second peak-value-holding signal based on the another PWM signal so as to generate a comparison signal; and a latching unit that is electrically connected to said input unit and said peak-values-comparing unit for receiving the control signal and the comparison signal respectively therefrom, for the first one of said N number of second DC-to-DC converting devices, said latching unit being configured to generate the second enabling signal based on the control signal and the comparison signal, and for the $i^{th}$ one of said N number of second DC-to-DC converting devices, said latching unit being configured to generate the (i+1) enabling signal based on the control signal and the comparison signal, wherein, for the $(i-1)^{th}$ one of said N number of second DC-to-DC converting devices, the starting time point of the logic-high level portion of the $(i)^{th}$ enabling signal matches a time point at which the comparison signal changes from a logic-low level to a logic-high level, and an ending time point of the logic-high level portion of the $(i)^{th}$ enabling signal, where the $(i)^{th}$ enabling signal changes from the logic-high level to a logic-low level, matches a time point of transition of the control signal from the logic-high level to the logic-low level.

8. The power converting system as claimed in claim 7, wherein said peak-values-comparing unit includes:

a first peak-value holder that is electrically connected to said first output end of said switching unit for receiving the part of the detection current, and that is configured to generate the first peak-value-holding signal based on the part of the detection current;

a second peak-value holder that is electrically connected to said second output end of said switching unit for receiving the another part of the detection current, and that is configured to generate the second peak-value-holding signal based on the another part of the detection current;

a counter that is electrically connected to said input unit for receiving the another PWM signal, and that is configured to generate a clock signal based on the another PWM signal; and a comparator that has a first input terminal electrically connected to said first peak-value holder for receiving the first peak-value-holding signal, a second input terminal electrically connected to said second peak-value holder for receiving the second peak-value-holding signal, a third input terminal electrically connected to said counter for receiving the clock signal, and an output terminal, wherein said comparator is configured to compare the first peak-value-holding signal and the second peak-value-holding signal so as to generate the comparison signal, and to output the comparison signal via said output terminal thereof.

9. The power converting system as claimed in claim 7, wherein said latching unit includes:

a latch that is electrically connected to said input unit and said peak-values-comparing unit for receiving the control signal and the comparison signal respectively therefrom, and that is configured to generate a switching-control signal based on the control signal and the comparison signal, latch, when the comparison signal changes from the logic-low level to the logic-high level and when the switching-control signal is at the logic-low level, the switching-control signal to a logic-high level, and change, when the control signal changes from a logic-high level to a logic-low level, the switching-control signal from the logic-high level to a logic-low level;

a transistor that has a first terminal which is configured to receive the DC input signal, a second terminal, and a control terminal which is electrically connected to said latch for receiving the switching-control signal, and that is configured to switch, based on the switching-control signal, between a conducting state and a non-conducting state, wherein for the first one of said N number of second DC-to-DC converting devices, said second terminal of said transistor is for outputting the second enabling signal, and for the $i^{th}$ one of said N number of second DC-to-DC converting devices, said second terminal of said transistor is for outputting the (i+1) enabling signal; and a resistor that has one end which is grounded, and the other end which is electrically connected to said second terminal of said transistor.

10. The power converting system as claimed in claim 7, wherein said voltage-dividing unit includes:

a first output resistor that has a receiving end connected to said converting unit, and a dividing end, for the first one of said N number of second DC-to-DC converting devices, said receiving end of said first output resistor being for receiving the second DC output voltage, and for the $i^{th}$ one of said N number of second DC-to-DC converting devices, said receiving end of said first output resistor being for receiving the $(i+1)^{th}$ DC output voltage; and a second output resistor that has another dividing end connected to said dividing end of said first output resistor, and a grounded end that is grounded, a voltage across said second output resistor being outputted as the feedback voltage.

11. The power converting system as claimed in claim 7, wherein said input unit includes:

an input circuit including a first comparator that has a non-inverting terminal for receiving the first preset reference voltage, an inverting terminal, and an output terminal, for the first one of said N number of second DC-to-DC converting devices, said inverting terminal of said first comparator being for receiving the first enabling signal and said output terminal of said first comparator being for outputting a first comparison result which is made by comparing the first preset reference voltage with the first enabling signal, and for the $i^{th}$ one of said N number of second DC-to-DC converting devices, said inverting terminal of said first comparator being for receiving the $i^{th}$ enabling signal and said output terminal of said first comparator being for outputting a first comparison result which is made by comparing the first preset reference voltage with the $i^{th}$ enabling signal, a second comparator that has a non-inverting terminal for receiving the second preset reference voltage, an inverting terminal, and an output terminal, for the first one of said N number of second DC-to-DC converting devices, said inverting terminal of said second comparator being for receiving the first enabling signal and said output terminal of said second comparator being for outputting a second comparison result which is made by comparing the second preset reference voltage with the first enabling signal, and for the $i^{th}$ one of said N number of second DC-to-DC converting devices, said inverting terminal of said second comparator being for receiving the $i^{th}$ enabling signal and said output terminal of said second comparator being for outputting a second comparison result which is made by comparing the second preset reference voltage with the $i^{th}$ enabling signal, and a logic unit that is electrically connected to said first comparator and said second comparator for receiving the first comparison result and the second comparison result respectively therefrom, and that is configured to generate the control signal based on the first comparison result and the second comparison result; and a PWM circuit including a third comparator that has a non-inverting terminal for receiving the third preset reference voltage, an inverting terminal for receiving the feedback voltage, and an output terminal for outputting a third comparison result which is made by comparing the third preset reference voltage with the feedback voltage, and a pulse-width modulator that is electrically connected to said converting unit, said switching unit and said peak-values-comparing unit, that is electrically connected to said logic unit and said third comparator for receiving the control signal and the third comparison result respectively therefrom, and that is configured to generate the another PWM signal based on the control signal and the third comparison result, and to output the another PWM signal to said converting unit, said switching unit and said peak-values-comparing unit.

12. A direct current to direct current (DC-to-DC) converting device, comprising:

a power convertor configured to receive a DC input signal, to generate a control signal at least based on the DC input signal, to generate a pulse-width modulation (PWM) signal at least based on the control signal and a feedback voltage, and to generate a DC output voltage based on the DC input signal and the PWM signal;

a voltage-dividing unit electrically connected to said power convertor for receiving the DC output voltage, and configured to divide the DC output voltage so as to generate the feedback voltage, and to output the feedback voltage to said power convertor;

a current-detecting unit configured to detect the DC input signal so as to generate a detection current;

a switching unit having a first output end and a second output end, electrically connected to said current-detecting unit and said power convertor for receiving the detection current and the PWM signal respectively therefrom, and configured to be controlled, based on the PWM signal, to output the detection current via said first output end and said second output end, alternately;

a peak-values-comparing unit electrically connected to said first output end and said second output end of said switching unit for receiving the detection current via said first output end and said second output end, alternately, electrically connected to said power convertor for receiving the PWM signal, and configured to generate a first peak-value-holding signal based on a part of the detection current received via said first output end of said switching unit, to generate a second peak-value-holding signal based on another part of the detection current received via said second output end of said switching unit, and to compare the first peak-value-holding signal and the second peak-value-holding signal based on the PWM signal so as to generate a comparison signal; and a latching unit electrically connected to said power convertor and said peak-values-comparing unit for receiving the control signal and the comparison signal respectively therefrom, and configured to generate an enabling signal based on the control signal and the comparison signal, wherein a starting time point of a logic-high level portion of the enabling signal, where the enabling signal is at a logic-high level, is later than a peak time point corresponding to a peak voltage of the DC output voltage, wherein the starting time point of the logic-high level portion of the enabling signal matches a time point at which the comparison signal changes from a logic-low level to a logic-high level, and wherein an ending time point of the logic-high level portion of the enabling signal, where the enabling signal changes from the logic-high level to a logic-low level, matches a time point of transition of the control signal from a logic-high level to a logic-low level.

13. The DC-to-DC converting device as claimed in claim 12, wherein said peak-values-comparing unit includes:

a first peak-value holder that is electrically connected to said first output end of said switching unit for receiving the part of the detection current, and that is configured to generate the first peak-value-holding signal based on the part of the detection current;

a second peak-value holder that is electrically connected to said second output end of said switching unit for receiving the another part of the detection current, and that is configured to generate the second peak-value-holding signal based on the another part of the detection current;

a counter that is electrically connected to said power convertor for receiving the PWM signal, and that is configured to generate a clock signal based on the PWM signal; and a comparator that has a first input terminal electrically connected to said first peak-value holder for receiving the first peak-value-holding signal, a second input terminal electrically connected to said second peak-value holder for receiving the second peak-value-holding signal, a third input terminal electrically connected to said counter for receiving the clock signal, and an output terminal, wherein said comparator is configured to compare, according to the clock signal, the first peak-value-holding signal and the second peak-value-holding signal so as to generate the comparison signal, and to output the comparison signal via said output terminal thereof.

14. The DC-to-DC converting device as claimed in claim 12, wherein said latching unit includes:
a latch that is electrically connected to said power convertor and said peak-values-comparing unit for receiving the control signal and the comparison signal respectively therefrom, and that is configured to
generate a switching-control signal based on the control signal and the comparison signal,
latch, when the comparison signal changes from the logic-low level to the logic-high level and when the switching-control signal is at the logic-low level, the switching-control signal to a logic-high level, and
change, when the control signal changes from the logic-high level to the logic-low level, the switching-control signal from the logic-high level to a logic-low level;

a transistor that has a first terminal which is configured to receive the DC input signal, a second terminal which is configured to output the enabling signal, and a control terminal which is electrically connected to said latch for receiving the switching-control signal, said transistor being configured to switch, based on the switching-control signal, between a conducting state and a non-conducting state; and a resistor that has one end which is grounded, and the other end which is electrically connected to said second terminal of said transistor.

\* \* \* \* \*